US012274310B2

(12) United States Patent
Walker et al.

(10) Patent No.: US 12,274,310 B2
(45) Date of Patent: Apr. 15, 2025

(54) DRY ATOMIZER

(71) Applicant: Jupiter Research, LLC, Phoenix, AZ (US)

(72) Inventors: Jordan Walker, Phoenix, AZ (US); Levi Morton, Mesa, AZ (US)

(73) Assignee: Jupiter Research, LLC, Phoenix, AZ (US)

( * ) Notice: Subject to any disclaimer, the term of this patent is extended or adjusted under 35 U.S.C. 154(b) by 652 days.

(21) Appl. No.: 17/375,942

(22) Filed: Jul. 14, 2021

(65) Prior Publication Data

US 2022/0015451 A1 Jan. 20, 2022

Related U.S. Application Data

(60) Provisional application No. 63/051,507, filed on Jul. 14, 2020.

(51) Int. Cl.
*A24F 40/57* (2020.01)
*A24F 40/51* (2020.01)
*A24F 40/53* (2020.01)

(52) U.S. Cl.
CPC .............. *A24F 40/57* (2020.01); *A24F 40/51* (2020.01); *A24F 40/53* (2020.01)

(58) Field of Classification Search
None
See application file for complete search history.

(56) References Cited

U.S. PATENT DOCUMENTS

2019/0272359 A1* 9/2019 Popplewell ............ G06F 21/32

FOREIGN PATENT DOCUMENTS

CN 109619688 A * 4/2019

* cited by examiner

*Primary Examiner* — Phu H Nguyen
(74) *Attorney, Agent, or Firm* — Schmeiser, Olsen & Watts LLP

(57) ABSTRACT

Various embodiments of the present technology may provide methods and apparatus for controlling an atomizer. The methods and apparatus for controlling an atomizer may be integrated within an electronic device. An embodiment of the system may include a control circuit responsive to an input signal from a sensor. The control circuit may be configured to determine a temperature event according to the input signal and a criteria. The control circuit may be further configured to generate an output signal according to the temperature event.

19 Claims, 6 Drawing Sheets

DRY ATOMIZER

CROSS-REFERENCE TO RELATED APPLICATION

This application claims the benefit of U.S. Provisional Patent Application Ser. No. 63/051,507, filed on Jul. 14, 2020, and incorporates the disclosure of the application in its entirety by reference.

BACKGROUND OF THE TECHNOLOGY

Vaporizer devices present an alternative to smoking and work by vaporizing a consumable, such as an oil concentrate or flower by heating the consumable at a lower temperature than an open flame so that a user can inhale the consumable in vapor form, rather than smoke.

A conventional vaporizer device typically has a chamber for holding the consumable and a small, heated coil in contact with the chamber. A current is typically passed through the coil, thereby heating the consumable. However, the chamber of a conventional vaporizer device is prone to overheating. Specifically, the heated coil typically continues to heat the chamber even after the consumable has been vaporized. Thus, any residue left in the chamber after the consumable has been vaporized is prone to combust, thereby increasing the presence of potentially harmful irritants that may be contained in smoke.

Accordingly, what is needed is a method and apparatus to monitor the temperature of the chamber and turn off the heated coil when the chamber is empty, thereby preventing the atomizer from overheating.

SUMMARY OF THE TECHNOLOGY

Various embodiments of the present technology may provide methods and apparatus for controlling an atomizer. The methods and apparatus for controlling the atomizer may be integrated within an electronic device. An embodiment of the system may include a control circuit responsive to an input signal from a sensor. The control circuit may be configured to determine a temperature event according to the input signal and a criteria. The control circuit may be further configured to generate an output signal according to the temperature event.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

DETAILED DESCRIPTION OF EMBODIMENTS

Figure 1:
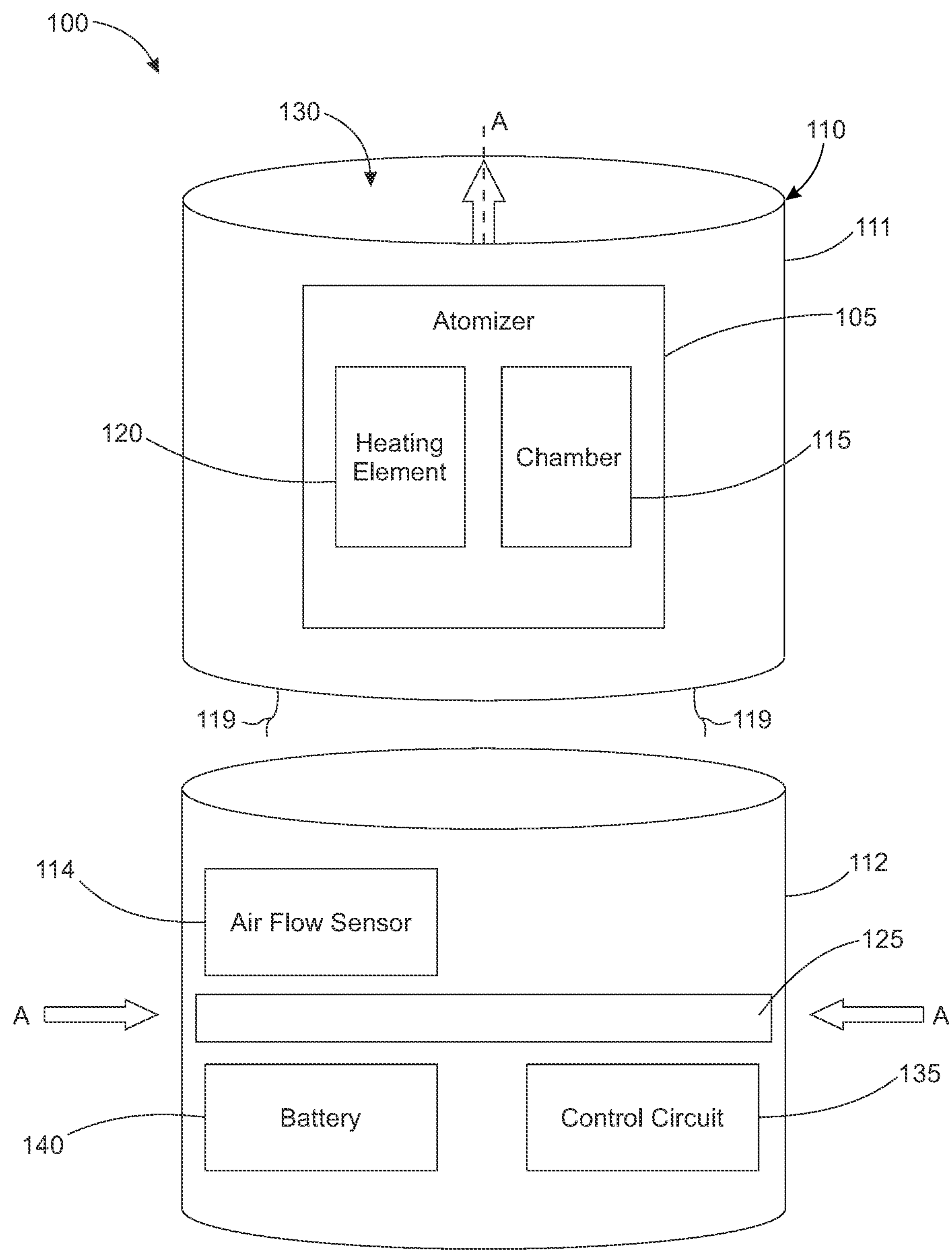
FIG. 1 is a block diagram of a vaporizer system in accordance with an embodiment of the present technology.
Figure 2:
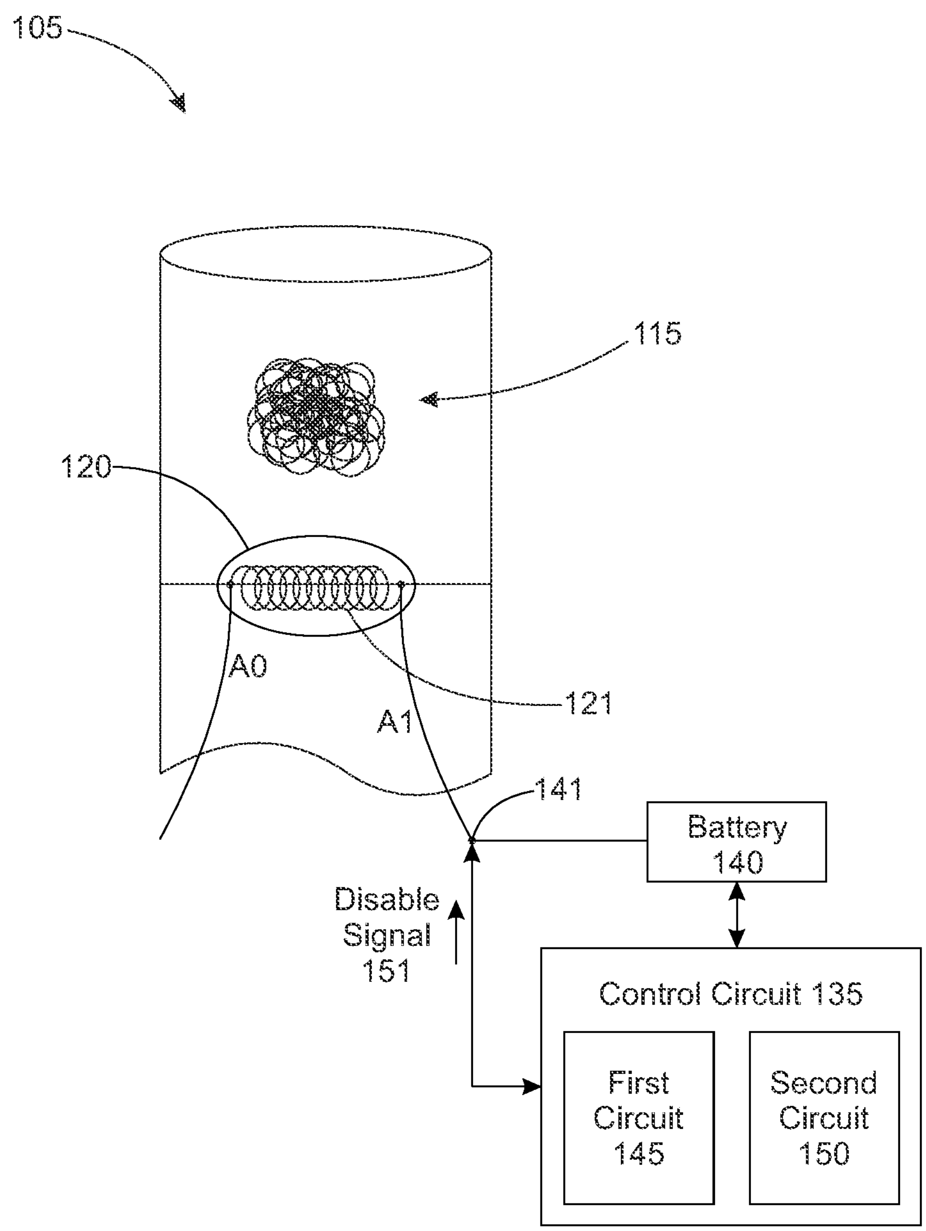
FIG. 2 representatively illustrates an atomizer in accordance with an embodiment of the present technology.

The present technology may be described in terms of functional block components. Such functional blocks may be realized by any number of components configured to perform the specified functions and achieve the various results. For example, the present technology may employ various atomizers, amplifiers, batteries, chambers, circuitry, coils, heating elements, inlets, logic components, outlets, processors, sensors, signals, thermistors, wires, and the like, which may carry out a variety of functions. In addition, the present technology may be practiced in conjunction with any one of various vaporizer systems, and the control circuit described herein is merely one exemplary application for the technology.

Referring to FIGS. 1-6, in various embodiments, a vaporizer system 100 may comprise an atomizer 105 adapted to be inserted into a housing 111 of a vaporizer device 110. The atomizer 105 may comprise a chamber 115 disposed within the atomizer 105, wherein the chamber 115 may be configured to hold a vaporizable material, such as a consumable. The chamber 115 may be constructed from a variety of suitable materials, such as ceramic, porous ceramic, cellulose, and the like. The consumable may include, but is not limited to, oil concentrates, *cannabis* flower, tobacco flower, and the like. The atomizer 105 may also comprise a sensor 106 coupled to the chamber 115 and a heating element 120 disposed within the atomizer 105, where the heating element 120 may be contact with the chamber 115 and may heat the vaporizable material to a temperature sufficient to vaporize the vaporizable material. The vaporizer system 100 may further comprise a base portion 112 connected to the housing 111 via wires 119, where the base portion 112 may comprise a control circuit 135 capable of controlling the heating element 120 and a battery 140 for supplying power to the vaporizer system 100.

Figure 3:
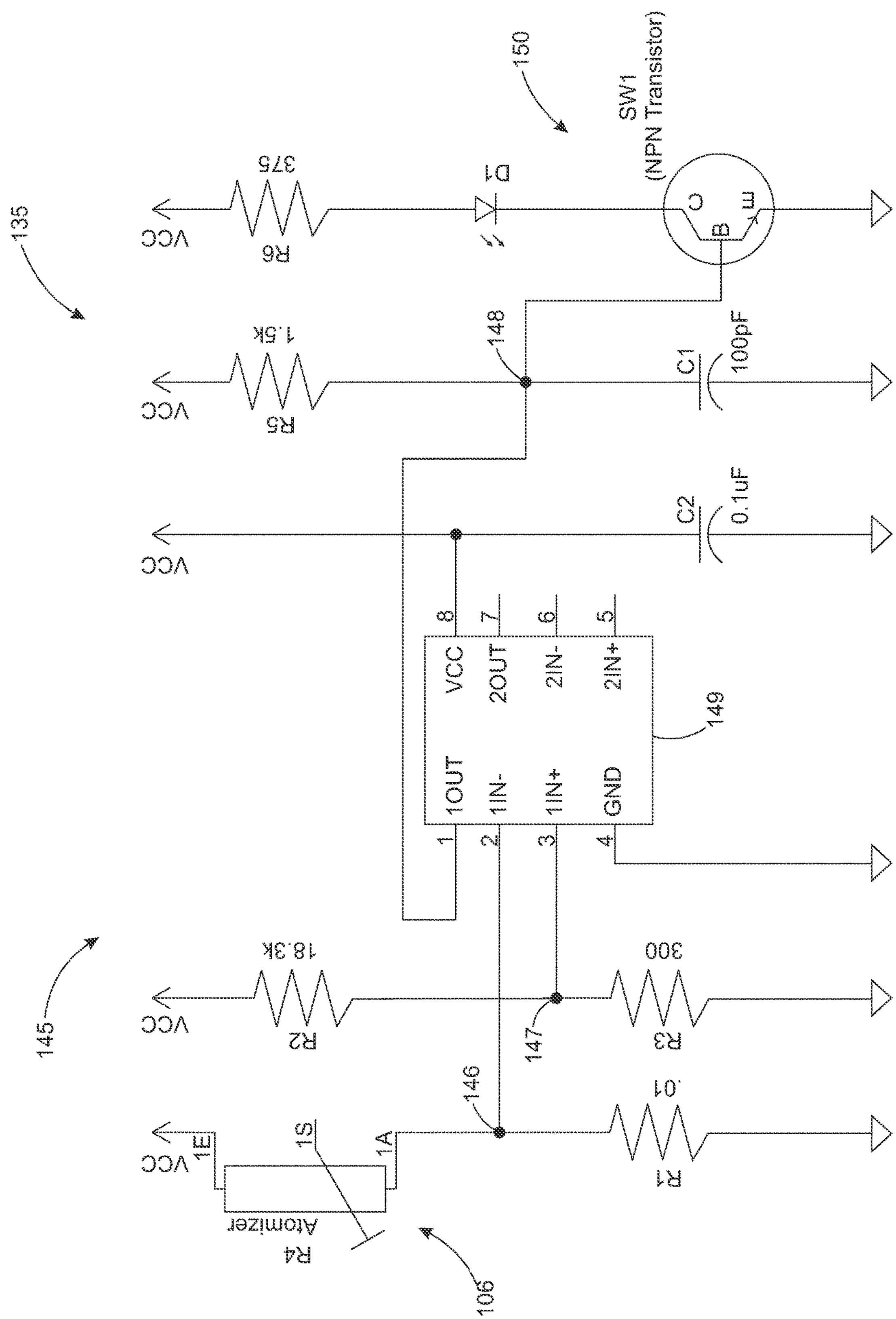
FIG. 3 is a simplified circuit diagram of a control circuit in accordance with an embodiment of the present technology.
Figure 4:
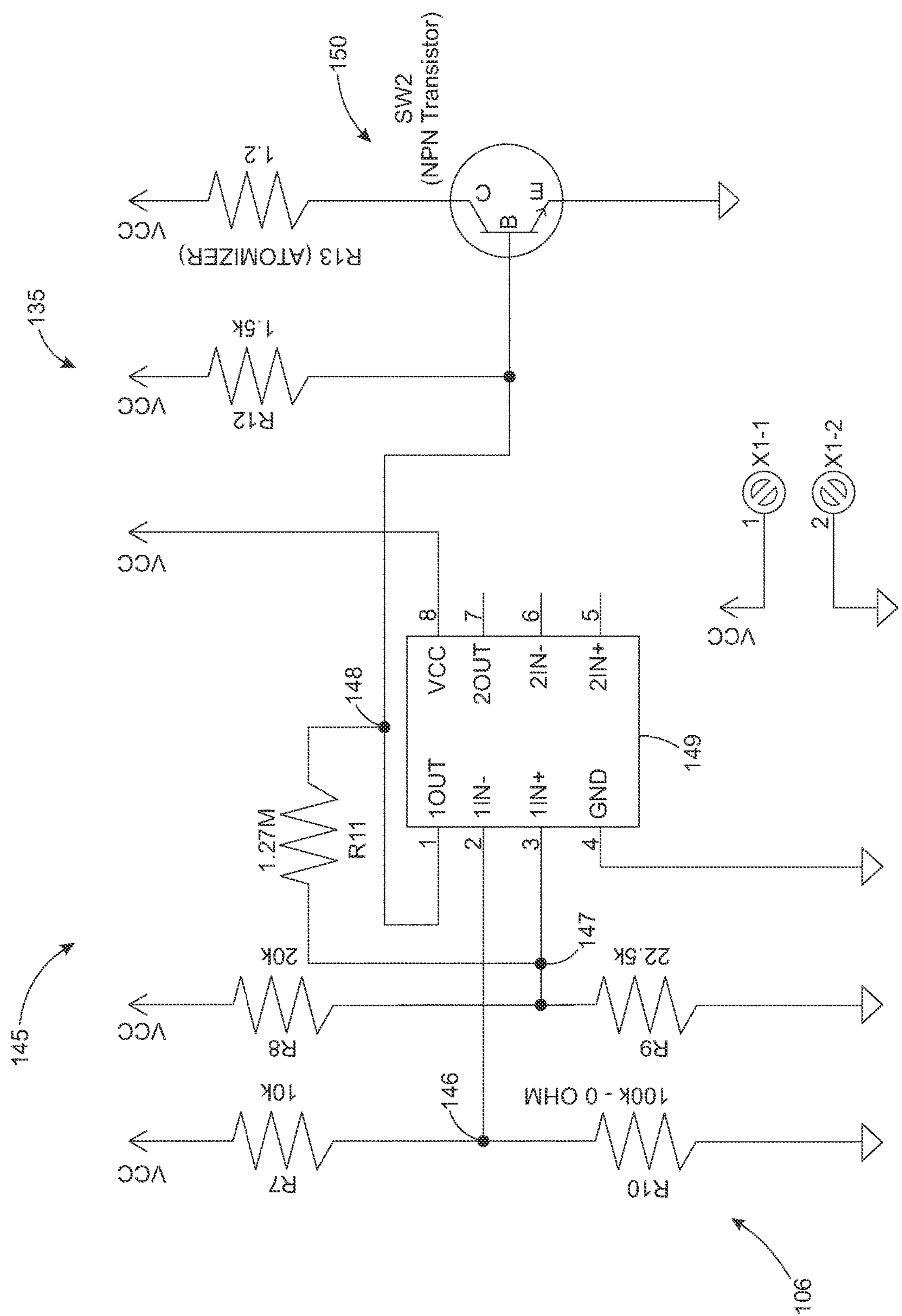
FIG. 4 is a simplified circuit diagram of a control circuit in accordance with an embodiment of the present technology.
Figure 5:
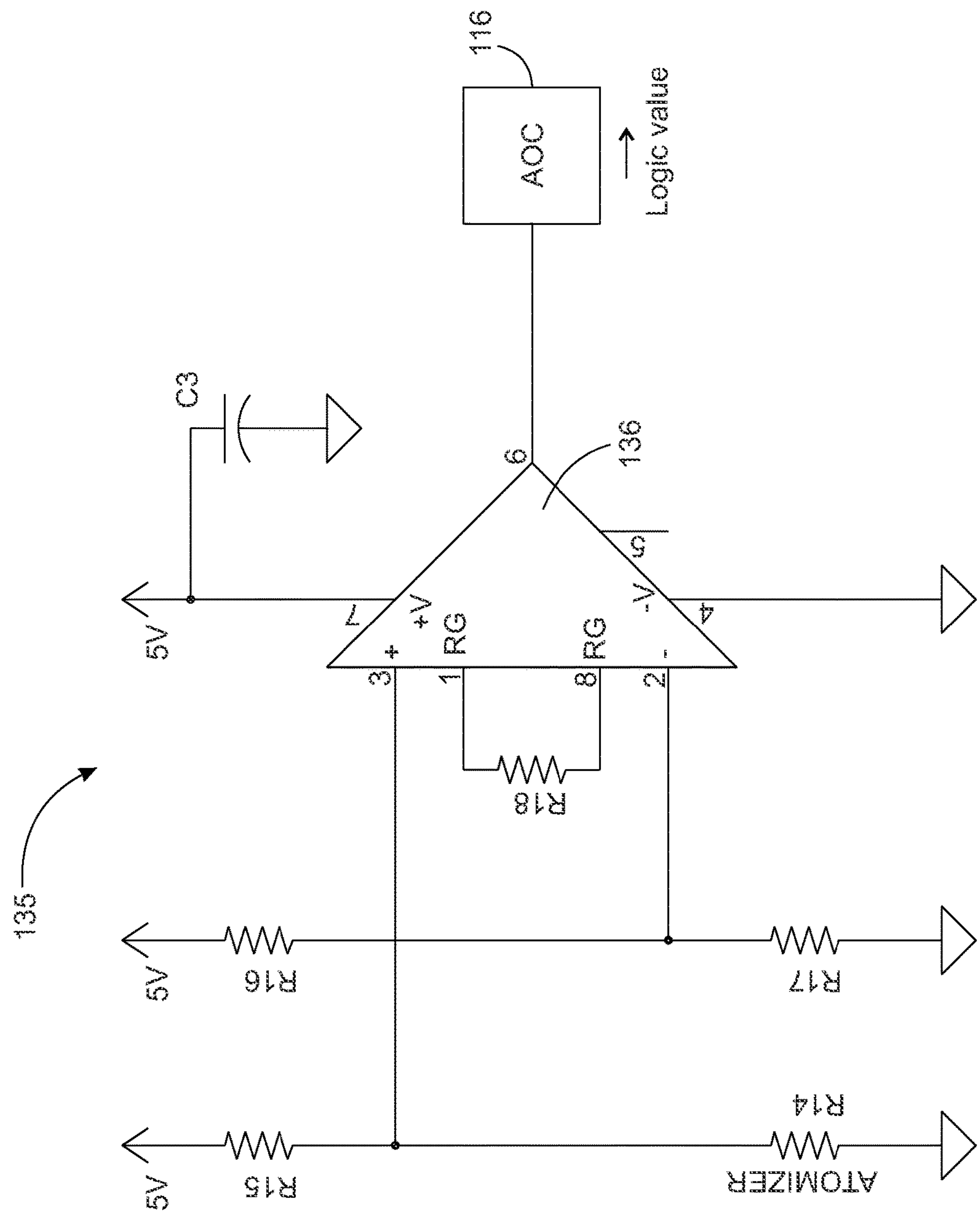
FIG. 5 is a simplified circuit diagram of a control circuit in accordance with an embodiment of the present technology.
Figure 6:
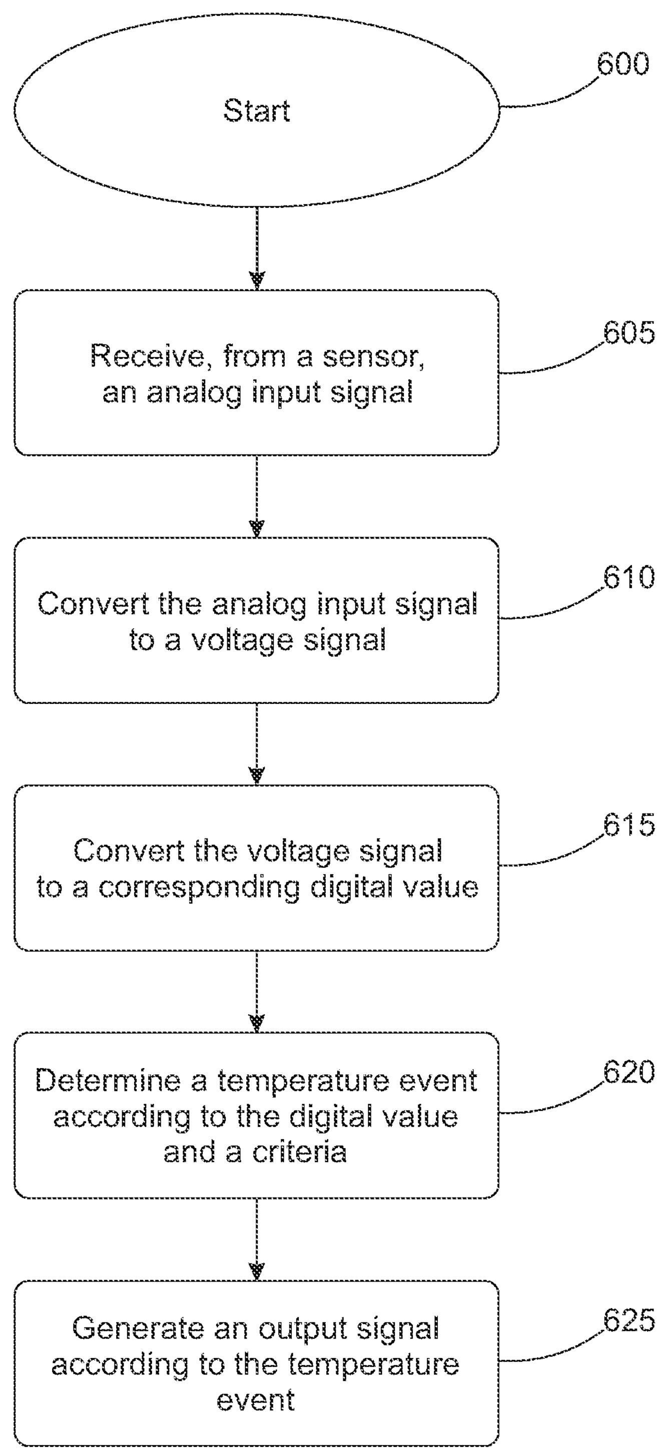
FIG. 6 is a flow chart for operating a control circuit in accordance with an embodiment of the present technology.

In an embodiment, and referring now to FIGS. 3 and 4, the control circuit 135 may be configured to perform various functions, such as amplification, signal conversion, signal analysis, and the like. For example, the control circuit 135 may comprise a first circuit 145 and a second circuit 150. The first circuit 145 may comprise a first input terminal 146, a second input terminal 147, and an output terminal 148. The first input terminal 146 may be an inverting terminal (−) and may be connected to the sensor 106 to receive an input signal from the sensor 106. For example, the sensor 106 may generate the input signal according to the temperature of the atomizer 105. In one embodiment, the sensor 106 may comprise a metal wire with a low temperature coefficient of resistance. The wire may be made from any suitable metal materials, such as copper, iron, stainless-steel, or any other combination of metal materials. The second input terminal 147 may be a non-inverting terminal (+) and may be connected to reference voltage, VCC, such as supplied by a voltage source (not shown).

The wire may be coupled to the chamber 115 to monitor the temperature inside the chamber 115. Specifically, as the temperature of the chamber 115 increases, the temperature of the wire may also increase. Since the electrical resistance of the wire may be dependent upon collisional processes within the wire, the resistance of the wire may increase as its temperature increases. According to various embodiments, the first circuit 145 may be configured to measure the resistance and/or detect changes in the resistance of the wire and convert the resistance to a voltage.

It will be appreciated that modifications may be made to the sensor 106 without departing from the scope of the invention. For example, instead of utilizing a wire to connect the first input terminal 146 of the first circuit 145 to the chamber 115, a thermistor, such as the tenth resistor R10, may be used to connect the first input terminal 146 of the first circuit 145 to the chamber 115. The thermistor may be used to monitor the temperature inside the chamber 115. Specifically, the thermistor may be coupled to the chamber 115 so that as the temperature of the chamber 115 increases, the temperature of the thermistor may also increase. The thermistor may comprise any suitable thermistor, such as an NTC thermistor, a PTC thermistor, and the like. Unlike the wire, such as described above, the resistance of the thermistor may decrease as its temperature increases. Accordingly, the first circuit 145 may measure the resistance and/or detect changes in the resistance of the thermistor and convert the resistance to a voltage.

According to various embodiments, the control circuit 135 may be constructed of any suitable electronic devices, such as conductors, capacitors, inductors, resistors, semiconductors, switches, transistors, operational amplifiers, potentiometers, logic gates, and the like. For example, in one embodiment, the control circuit 135 may comprise a first resistor R1, a second resistor R2, a third resistor R3, a fourth resistor R4, a fifth resistor R5, and a sixth resistor R6, such as shown in FIG. 3. The control circuit 135 may also comprise a first diode D1, a first switch SW1, which may be an NPN transistor, a first capacitor C1, and a second capacitor C2. In this regard, the fourth resistor R4 may be a wire. Accordingly, the sensor 106 may comprise the fourth resistor R4. In an alternative embodiment, the control circuit 135 may comprise a seventh resistor R7, an eighth resistor R8, a ninth resistor R9, a tenth resistor R10, an eleventh resistor R11, a twelfth resistor R12, and a thirteenth resistor R13, such as shown in FIG. 4. The control circuit 135 may also comprise a second switch SW2, which may be an NPN transistor. In this regard, the tenth resistor R10 may be a thermistor, and the sensor 106 may comprise the tenth resistor R10.

As shown in FIG. 4, the output terminal 148 may be connected to the second input terminal 147 via a feedback loop comprising the eleventh resistor R11. The control circuit 135 may utilize the feedback loop to re-enable the heating element 120 when the temperature inside the chamber 115 is less than or equal to a predetermined value. The predetermined value may be any suitable value. As an example, in the case where the control circuit 135 is configured to disable the heating element 120 if the temperature inside the chamber 115 is greater than or equal to 572° F., the control circuit 135 may also be configured to re-enable the heating element 120 if the temperature inside the chamber 115 drops below 518° F.

The first circuit 145 may comprise any suitable circuit and/or system. For example, the first circuit 145 may comprise a sub-circuit 149. The sub-circuit 149 may comprise an amplifier circuit or any other circuit and/or system suitable for receiving an input signal and amplifying the input signal. The sub-circuit 149 may be configured to measure a voltage difference between the inverting (−) and non-inverting terminals (+) and generate a voltage signal according to the voltage difference. The amplifier 136 may also be configured to amplify a signal by applying a gain to the voltage difference and generate a voltage signal according to the voltage difference and/or the applied gain. The sub-circuit 149 may comprise an analog-to-digital converter (ADC) (not shown) configured to convert a voltage, such as the voltage signal, to a digital value. The ADC (not shown) may comprise any signal converter suitable for converting an analog signal to a digital signal. In addition, the sub-circuit 149 may comprise a comparator circuit (not shown) configured to compare the digital value to a criteria, where the criteria may comprise a predetermined threshold value. The first circuit 145 may be programmed with the threshold value, and the threshold value may correspond to a particular digital value. For example, the digital value may correspond to a temperature such that if the temperature inside the chamber 115 is equal to or exceeds such temperature, the control circuit 135 may instruct the vaporizer system 100 to disable the heating element 120.

The first circuit 145 may utilize the threshold value to determine whether the heating element 120 should be turned off. For example, the first circuit 145 may compare the digital value from the ADC with the threshold value and generate an output signal, such as a logic signal corresponding to the comparison. The logic signal may have a first value (e.g. a logic ‘0’ value) if the digital value is less than the threshold value and may have a second value (e.g., a logic ‘1’ value) if the digital value is greater than or equal to the threshold value. The threshold value may be a predetermined value based on the particular application, size of the chamber 115, desired temperature of the chamber 115, and the like. The first value may indicate an absence of vaporizable material inside the chamber 115 (i.e., an OFF event, meaning the control circuit 135 may instruct the vaporizer system 100 to disable the heating element 120) and the second value may indicate the presence of vaporizable material inside the chamber 115 (i.e., an ON event, meaning the control circuit 135 may not instruct the vaporizer system 100 to disable the heating element 120).

According to various embodiments, the first circuit 145 may be configured to selectively transmit the output signal, such as the logic signal, to the second circuit 150 for further processing. For example, in one embodiment, the first circuit 145 may transmit only the second value of the logic signal to the second circuit 150. In another embodiment, the first circuit 145 may transmit only the first value of the logic signal to the second circuit 150. In yet another embodiment, the first circuit 145 may transmit both the first value and the second value of the logic signal to the second circuit 150.

The second circuit 150 may receive the logic signal from the first circuit 145 and may comprise any number of circuits, logic gates, and the like that operate together to process the logic signal. The second circuit 150 may be configured to enable and disable the heating element 120 according to the logic signal. For example, in the case where the first circuit 145 may be configured to selectively transmit only the second value of the logic signal to the second circuit 150, the second circuit 150 may be configured to receive the second value from the first circuit 145 and generate a disable signal 151 according to the second value. For example, and referring to FIG. 2, the heating element 120 may comprise a pair of wires, A, comprising two wires A0, A1. Wire A0 may be connected to a ground node or reference node, and wire A1 may be connected to the battery 140 at a port 141. The port 141 may be configured to receive and respond to the disable signal 151. Specifically, the port 141 may be connected to the second circuit 150 for receiving the disable signal 151. The port 141 may be configured to disable itself in response to receiving the disable signal 151. For example, the port 141 may comprise a simple switch (not shown) where the port 141 may open the switch, thereby opening the circuit between the battery 140 and the various components of the vaporizer system, including the heating element 120. Once the switch (not shown) is open, the battery 140 may not supply current to heating element 120.

It will be appreciated that modifications may be made to the control circuit 135 without departing from the scope of the invention. For example, in yet another embodiment, and referring now to FIG. 5, the control circuit 135 may comprise a fourteenth resistor R14, a fifteenth resistor R15, a sixteenth resistor R16, a seventeenth resistor R17, and an eighteenth resistor R18. The control circuit 135 may also comprise a third capacitor C3 and an amplifier 136. The amplifier 136 may comprise an amplifier circuit or any other circuit and/or system suitable for receiving an input signal and amplifying the input signal. In this regard, the control circuit 135 may be configured to measure the resistance and/or detect changes in the resistance and convert the resistance to a voltage. Accordingly, the amplifier 136 may comprise an inverting terminal (−) and a non-inverting terminal (+) and may be configured to measure a voltage difference between the inverting and non-inverting terminals. The amplifier 136 may also be configured to amplify a signal by applying a gain to the voltage difference and generate a voltage signal according to the voltage difference and/or the applied gain. The amplifier 136 may also comprise an output terminal connected to an analog-to-digital converter (ADC) 116. The ADC 116 may be configured to convert a voltage, such as the voltage signal, to the digital value.

It will be appreciated that the first circuit 145 may be formed on a separate substrate from the second circuit 150. In another embodiment, the first circuit 145 may be formed on the same substrate as the second circuit 150. The substrate may be any suitable substrate, such as a printed circuit board (PCB), or the like. The second circuit 150 may comprise any suitable control circuit, such as a pulse width modulation (PWN) control circuit, and the like.

In operation, the vaporizer system 100 may be turned on by a sensor 114 or by pressing a button or switch. For example, in the case where the vaporizer device 110 is "draw-activated", a user may turn on the vaporizer device 110 by drawing air into the vaporizer device 110 via the inlet 125 by inhaling through a mouthpiece (not shown) connected to the outlet 130. When the user inhales, a negative pressure may be induced inside the vaporizer device 110. The negative pressure induced inside the vaporizer device 110 may cause the sensor 114 to close a pressure switch (not shown), thereby closing the circuit between the battery 140 and the various components of the vaporizer system 100. Once the pressure switch (not shown) is closed, the battery 140 may supply power to the various components of the vaporizer system 100, including the heating element 120. Once the heating element 120 is enabled, the battery 140 may supply a current to the enabled heating element 120, wherein the current may flow through a coil 121 of the enabled heating element 120. Because the coil 121 may be a resistive element, the coil may dissipate heat when the current flows through it. Further, because the heating element 120 may be in contact with the chamber 115, the resulting heat may be transferred to the chamber 115. Accordingly, the heating element 120 may vaporize a portion of the vaporizable material by heating the chamber 115 to a temperature sufficient to generate the vapor. For example, in the case of *cannabis* oil concentrate, the oil concentrate held in the chamber 115 may be heated to a temperature of approximately 215 to 480° F. to create an aerosolized vapor therefrom.

During this time, the control circuit 135 may monitor the temperature inside the chamber 115 via the sensor 106, and thus may control the atomizer 105 according to the sensor 106. Specifically, and referring to FIGS. 1-6, controlling the atomizer 105 according to the sensor 106 (600) may comprise receiving, from the sensor 106, an analog input signal (605), where the analog input signal may be a resistance signal. Controlling the atomizer 105 according to the sensor 106 may also comprise converting the resistance signal to a voltage signal (610). In addition, controlling the atomizer 105 may comprise converting the voltage signal to a corresponding digital value (615). Controlling the atomizer 105 may further comprise determining a temperature event, such as the ON event and/or the OFF event, according to the digital value and the criteria (620). As discussed above, the criteria may be a predetermined threshold value, e.g., voltage value, that corresponds to a particular temperature, such as the maximum desirable temperature of the chamber 115. Specifically, the first circuit 145 may compare the digital value to the threshold value. Controlling the atomizer 105 may further comprise generating an output signal, such as the logic signal, according to the temperature event (625). For example, the logic signal may comprise the second value if the digital value is greater than or equal to the threshold value. In this case the logic signal may be an OFF signal corresponding to the temperature event. At this time, the first circuit 145 may transmit the logic signal to the second circuit 150 where the second circuit 150 may generate the disable signal 151 according to the second value of the logic signal. The second circuit 150 may then transmit the disable signal 151 to the port 141. In response to receiving the disable signal 151, the port 141, which may comprise a simple switch (not shown) may open the switch, thereby opening the circuit between the battery 140 and the various components of the vaporizer system, including the heating element 120. Accordingly, once the switch (not shown) is open, the battery 140 may not supply current to the heating element 120.

In the foregoing specification, the technology has been described with reference to specific embodiments. Various modifications and changes may be made, however, without departing from the scope of the present technology as set forth in the claims. The specification and figures are illustrative, rather than restrictive, and modifications are intended to be included within the scope of the present technology. Accordingly, the scope of the technology should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims. Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise," "comprises," "comprising," "having," "including," "includes," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A control circuit adapted to communicate with a temperature sensor and capable of controlling a heating element of an atomizer having a chamber disposed within the atomizer, wherein the chamber is configured to hold a vaporizable material, comprising:
a first circuit, comprising:
an input terminal configured to receive an input signal from the temperature sensor; and
an output terminal;
wherein the first circuit is configured to:
transform the input signal to a voltage signal;
convert the voltage signal to a digital value; and
determine a temperature event within the atomizer according to the digital value and a criteria; and
generate an output signal according to the temperature event within the atomizer; and
a second circuit connected to the output terminal and configured to receive the output signal, wherein the temperature sensor and the heating element are disposed within the atomizer, and wherein the temperature sensor is coupled to the chamber.

2. The control circuit of claim 1, wherein the criteria comprises a predetermined threshold value.

3. The control circuit of claim 2, wherein the first circuit is configured to compare the digital value to the threshold value.

4. The control circuit of claim 3, wherein the first circuit is configured to generate the output signal if the digital value is greater than or equal to the threshold value.

5. The control circuit of claim 4, wherein the output signal is an OFF signal corresponding to the temperature event within the atomizer.

6. The control circuit of claim 5, wherein the second circuit is further configured to disable the heating element disposed within the atomizer in response to receiving the OFF signal.

7. The control circuit of claim 1, wherein:
the output terminal is connected to the input terminal via a feedback loop, wherein
the feedback loop comprises a resistor; and
the control circuit is further configured to enable the heating element disposed within the atomizer via the feedback loop.

8. The control circuit of claim 1, wherein the temperature sensor is a metal wire.

9. A system, comprising:
a temperature sensor configured to generate an input signal;
an atomizer, comprising:
a chamber configured to hold a vaporizable material; and
a heating element configured to apply heat to the chamber, wherein the temperature sensor is disposed within the atomizer and coupled to the chamber; and
a control circuit in communication with the temperature sensor and capable of controlling the heating element, comprising:
a first circuit, comprising:
an input terminal configured to receive the input signal; and
an output terminal;
wherein the first circuit is configured to:
transform the input signal to a voltage signal;
convert the voltage signal to a digital value;
determine a temperature event within the atomizer according to the digital value and a criteria; and
generate an output signal according to the temperature event within the atomizer; and
a second circuit connected to the output terminal and configured to receive the output signal.

10. The system of claim 9, wherein the temperature sensor comprises at least one of a wire or a thermistor.

11. The system of claim 9, wherein the criteria comprises a predetermined threshold value.

12. The system of claim 11, wherein the first circuit is configured to compare the digital value to the threshold value.

13. The system of claim 12, wherein the first circuit is configured to generate the output signal if the digital value is greater than or equal to the threshold value.

14. The system of claim 13, wherein the output signal is an OFF signal corresponding to the temperature event within the atomizer.

15. The system of claim 14, wherein the second circuit is further configured to disable the heating element of the atomizer in response to receiving the OFF signal.

16. The system of claim 9, wherein:
the output terminal is connected to the input terminal via a feedback loop, wherein
the feedback loop comprises a resistor; and
the control circuit is further configured to enable the heating element of the atomizer via the feedback loop.

17. The system of claim 9, wherein the vaporizable material is a flower.

18. The system of claim 17, wherein the flower is *cannabis* flower and/or tobacco flower.

19. The system of claim 9, wherein the temperature sensor is a metal wire.

* * * * *